United States Patent [19]
Li

[11] Patent Number: 5,301,274
[45] Date of Patent: Apr. 5, 1994

[54] METHOD AND APPARATUS FOR AUTOMATIC BALANCING OF MODEM RESOURCES

[75] Inventor: Ping Li, New Brighton, Minn.

[73] Assignee: Multi-Tech Systems, Inc., Minneapolis, Minn.

[21] Appl. No.: 746,857

[22] Filed: Aug. 19, 1991

[51] Int. Cl.$^5$ .................. H04B 14/04; H04M 11/06; G06F 3/00; G06F 13/00

[52] U.S. Cl. .................. 395/250; 395/325; 375/8; 364/238.5; 364/239; 364/239.6; 364/239.7; 364/260; 364/260.6; 364/DIG. 1

[58] Field of Search .......... 395/250, 200, 275, 325, 395/775; 375/8; 370/95.2, 32, 85.1; 379/90, 93, 88, 351, 350, 2, 6, 8, 35, 144, 275, 233, 237, 256, 278, 751; 340/825.5; 381/32

[56] References Cited

U.S. PATENT DOCUMENTS

| | | | |
|---|---|---|---|
| Re. 32,580 | 1/1988 | Atal et al. | 381/40 |
| 3,927,268 | 12/1975 | Scinlli et al. | 179/15 BW |
| 3,997,729 | 12/1976 | Costales et al. | 179/15 AS |
| 4,009,346 | 2/1977 | Parker et al. | 179/15 AQ |
| 4,298,954 | 11/1981 | Bigelow et al. | 364/900 |
| 4,368,512 | 1/1983 | Kyu et al. | 364/200 |
| 4,388,697 | 6/1983 | Breen et al. | 364/900 |
| 4,472,832 | 9/1984 | Atal et al. | 381/40 |
| 4,514,825 | 4/1985 | Nordling | 364/900 |
| 4,823,312 | 4/1889 | Michael et al. | 394/900 |
| 4,841,574 | 6/1989 | Pham et al. | 381/31 |
| 4,902,881 | 2/1990 | Janku | 235/381 |
| 4,914,699 | 4/1990 | Dunn et al. | 380/34 |
| 4,922,520 | 5/1990 | Bernard et al. | 379/88 |
| 4,926,482 | 5/1990 | Frost et al. | 381/31 |
| 5,163,132 | 10/1992 | Dulac et al. | 395/275 |
| 5,202,884 | 4/1993 | Close et al. | 370/94.1 |

FOREIGN PATENT DOCUMENTS

62-016638 1/1987 Japan.
2110906 6/1983 United Kingdom ........ G10L 1/100

OTHER PUBLICATIONS

Microcom Systems, "QX/4232hs Error-Correcting Modem Reference Manual", 1990, p. 82.
Telebit Inc., "T2500 Reference Manual", 1990, pp. 5-13.
Byrd, Mike, "Breaking The Speed Barrier", Dec. 11, 1990, PC Magazine, reprint.

Primary Examiner—Gopal C. Ray
Attorney, Agent, or Firm—Schwegman, Lundberg & Woesnner

[57] ABSTRACT

A method for dynamically changing the polling process of a single microprocessor within a modem. An additional step is added into the main polling loop that checks the amount of data in the transmit and receive buffers. If one buffer is empty, additional polling cycles are performed to service the other buffer. The number of additional cycles is dependent on how full the buffer is. If both buffers contain data, no change is made in the polling process and both are serviced with equal priority.

2 Claims, 3 Drawing Sheets

METHOD AND APPARATUS FOR AUTOMATIC BALANCING OF MODEM RESOURCES

BACKGROUND OF THE INVENTION

The present invention pertains generally to data communications devices, and more particularly to a method of dynamically allocating modem resources to process data with higher compression ratios.

BACKGROUND OF THE INVENTION

As the need to transfer larger amounts of information becomes greater, data communications devices such as modems have adopted several strategies for increasing the amount of information they can transfer in a given amount of time. One such strategy involves the use of dynamic data compression and decompression. By using increasingly sophisticated strategies, higher data compression ratios are possible, thus increasing the effective amount of information that can be transferred without increasing the line baud rate. However, higher data compression ratios require a greater amount of computation, and modems designed for lower compression ratios may have difficulty keeping up with higher compression ratios at the highest baud rates.

Modern modems use an analog-to-digital (A/D) converter to sample an incoming line signal and convert it to a digitized signal which is then stored temporarily in a memory area until one or more microprocessors can process the signal, decompress the data, and transmit it to the host. In a single microprocessor system, the microprocessor must also compress and transmit outgoing data and respond to internal control requests. The microprocessor uses a polling strategy to check and service input, output and control functions in turn.

The nature of most high duty data communications involves a relatively large amount of information sent in one direction in the form of data packets and a relatively small amount of information sent in the opposite direction in the form of acknowledgements. During these high transmit or receive periods the microprocessor may fall behind and reduce throughput because it is polling and servicing all functions equally when the amount of processing required by each function is not equal.

Therefore, there is a need to provide a method to increase the amount of time spent processing functions that require a high degree of service and reduce the amount of time spent processing functions that require a low degree of service.

SUMMARY OF THE INVENTION

The present invention provides a method for dynamically changing the polling process of a single microprocessor within a modem. An additional step is added into the main polling loop that checks the amount of data in the transmit and receive buffers. If one buffer is empty, additional polling cycles are performed to service the other buffer. The number of additional cycles is dependent on how full the buffer is. If both buffers contain data, no change is made in the polling process and both are serviced with equal priority.

The method for dynamically changing the polling process requires no additional memory for buffers and requires only slightly more program code to implement. A system implemented according to the present invention demonstrates a noticeable increase in the speed with which compressed data can be transmitted than systems implemented under previous methods.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
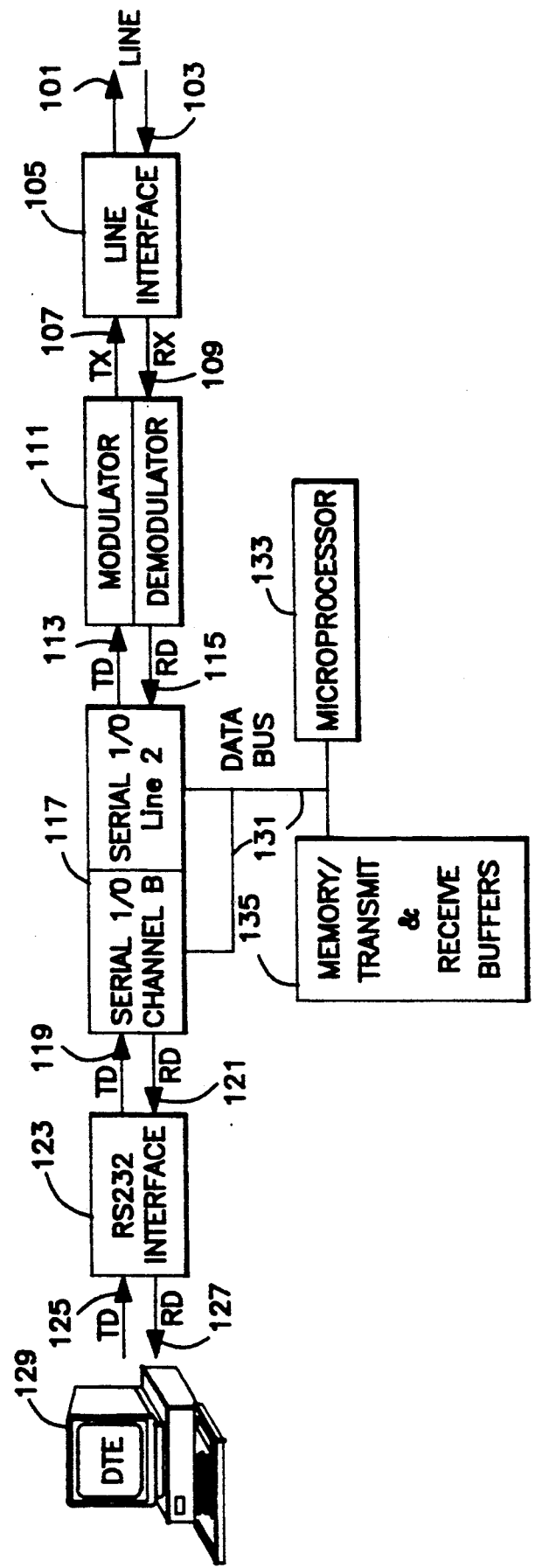
FIG. 1 is a block diagram showing the high-level architecture of typical modem according to the present invention.

FIG. 1 shows the high level architecture of a typical single microprocessor modem. The line transmit signal 101 exits and receive signal 103 enters a telephone line interface 105 which converts line voltages to internal voltages. The analog transmit signal 107 exits and receive signal 109 enters a modulator/demodulator 111 where they are converted from and to serial digital signals. The serial digital transmit signal 113 exits and the serial digital receive signal 115 enters a serial input-/output (I/O) device 117 which converts them from and to parallel signals for the internal data bus 131. Data Terminal Equipment (DTE) 129 serial digital transmit signal 125 enters and receive signal 127 exits an RS232 interface 123 where they are converted to internal digital transmit 119 and receive 121 signals, which then enter or exit the serial I/O device 117. A microprocessor 133 and random access memory (RAM) 135 serving as a transmit buffer and a receive buffer, communicate via the internal data bus 131.

Figure 2:
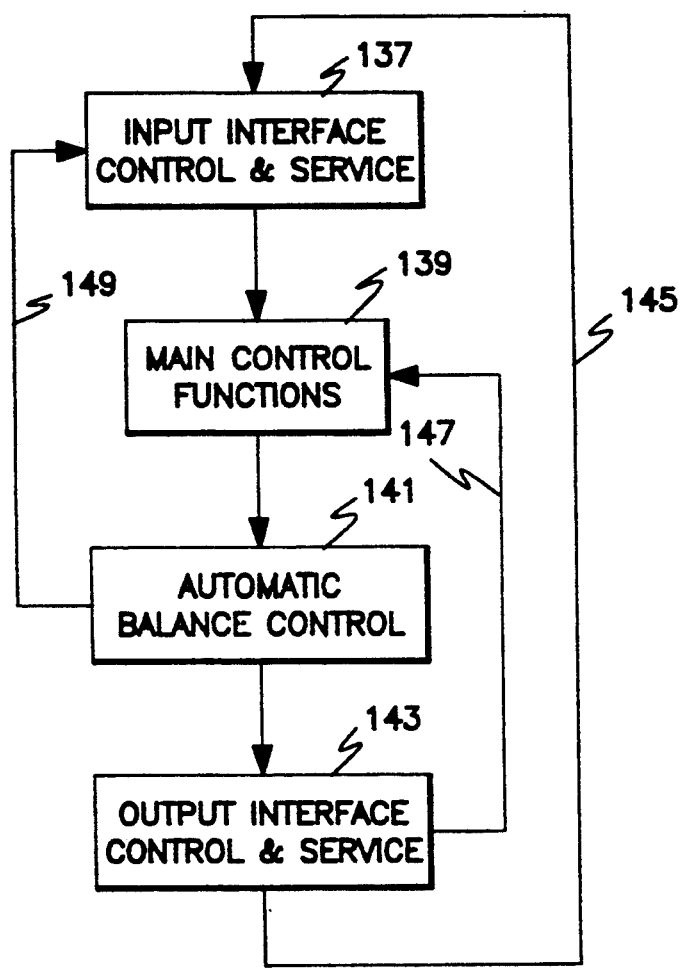
FIG. 2 is a flow diagram showing the steps taken to poll modem functions according to the present invention.

FIG. 2 shows the four steps the microprocessor performs in its main polling loop. Step 1 is represented by Input Interface 137, which processes any incoming data. Step 2 is represented by Main Control 139, which processes any internal control requests. Step 3 is represented by Automatic Balance Control 141, which checks the amount of data in the transmit and receive buffers. If the transmit buffer is empty and the receive buffer is not empty, control is transfered 149 back to the input interface 137. Step 4 is represented by Output Interface 143, which processes any outgoing data. If in step 3 both the transmit and receive buffers are not empty, control is transfered 145 back to the input interface 137. Otherwise, only the receive buffer is empty and it transfers control 147 back to the main control 139.

Figure 3:
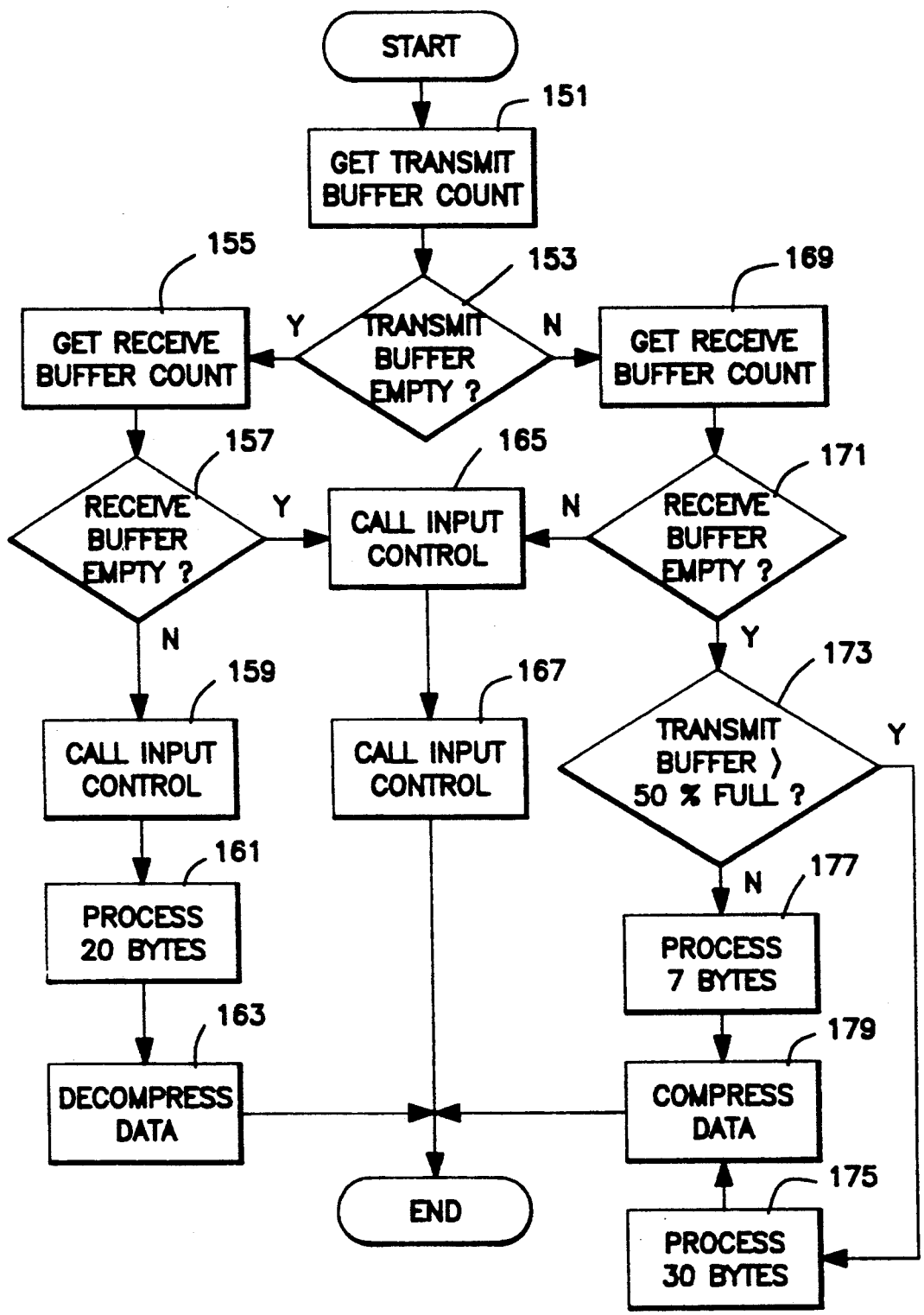
FIG. 3 is a flow diagram representative of the steps taken to dynamically change the polling priority according to the present invention.

The method for automatic balance control is shown in FIG. 3. At 151 the transmit data buffer count is read and checked at 153 to see if it is zero. If the transmit data buffer count is zero, the receive buffer data count is read at 155 and checked at 157 to see if it is zero. If the receive buffer data count is zero, the input control function is called at 165 and the output control function is called at 167 before exiting. If the receive buffer data count is not zero, the input control function is called at 159, and the output control function is called twenty times 161. The data compression function is then called at 163 before exiting.

If when the transmit buffer was originally checked at 153 it was found to be not empty, the receive buffer data count is read at 169 and checked at 171 to see if it is zero. If the receive buffer data count is not zero, the input control function is called at 165 and the output control function is called at 167 before exiting. If the receive buffer data count is zero, the transmit buffer is checked at 173 to see if it is greater than fifty percent full. If the transmit buffer is greater than fifty percent full, the output control function is called thirty times at 175 then the data compression function is called at 179 before exiting. If the transmit buffer is less than or equal to fifty percent full, the output control function is called seven times at 177 then the data compression function is called at 179 before exiting.

As described above, the automatic resource balancing method checks the contents of both the transmit and receive buffers. If both contain data they are both serviced equally to provide a prompt response and avoid losing data. If the transmit buffer is empty and the receive buffer is not empty, more data is coming in than going out, therefore twenty bytes are processed from the receive buffer before checking the transmit buffer again. If the receive buffer is empty and the transmit buffer is not empty, more data is going out than coming in, therefore if the transmit buffer is less than fifty percent full, seven bytes are processed from the transmit buffer before checking the receive buffer again. If the transmit buffer is greater than fifty percent full, the data is still not being processed fast enough, therefore thirty bytes are processed from the transmit buffer before checking the receive buffer again.

The values of twenty iterations for the input buffer and seven iterations and thirty iterations for the output buffer are empirically derived as optimal values for the described modem architecture at a compression ratio of 4:1 at a line baud rate of 9600. The optimal values may be different for other modem architectures or data compression ratios or line baud rates.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. A modem for use in transferring data between a communication line and a data terminal, comprising:

a memory containing a transmit buffer and a receive buffer each for storing bytes of data;

modulator means for modulating compressed data and transferring it onto the communication line, demodulator means coupled to the memory for transferring compressed data from the communication line and for demodulating the compressed data to produce demodulated data and for transferring the demodulated data to the receive buffer;

processing means coupled to the modulator means and the memory and operative in an input mode for retrieving data from the transmit buffer, compressing it, and supplying it to the modulator means, and in an output mode for retrieving data from the receive buffer, decompressing it, and presenting it to the data terminal; and mode control means coupled with the processing means for controlling the relative amount of time the processing means operates in the input mode and the output mode according to the quantity of data in the transmit and receive buffers, the mode control means including means for operating the processing means in an operating loop, and in a first part of the loop checking the quantity of data in the transmit and receive buffers, and in a second subsequent part of the loop operating the processing means alternately in the input mode and the output mode with each mode active an amount of time responsive to the quantity of data in the transmit and receive buffers, the mode control means including means responsive to the presence of data in the transmit buffer and absence of data in the receive buffer for causing the processing means to be active in the input mode an amount of time substantially more than in the output mode in the second subsequent part of the loop, the mode control means including means responsive to the absence of data in the transmit buffer and presence of data in the receive buffer to cause the processing means to be active in the output mode an amount of time substantially more than in the input mode in the second subsequent part of the loop, the mode control means including means responsive to the presence of data in the transmit buffer and presence of data in the receive buffer to cause the processing means to be active in the output mode substantially the same amount of time as in the input mode in the second subsequent part of the loop.

2. Apparatus according to claim 1, further wherein the mode control means includes means for checking the transmit buffer to determine if it is more than a predetermined amount full, and if more than the predetermined amount full causing the processing means to be active in the input mode a first amount of time in the second subsequent part of the loop, and if not more than the predetermined amount full, causing the processing means to be active in the input mode a second amount of time substantially less than the first amount of time in the second subsequent part of the loop, the transmit buffer having a certain capacity, and said predetermined amount being a substantial amount of the buffer's capacity.

* * * * *